United States Patent
Cohen et al.

(10) Patent No.: US 8,649,500 B1
(45) Date of Patent: Feb. 11, 2014

(54) DYNAMIC ALLOCATION OF AGENTS FOR OUTBOUND CALLING IN AN AUTOMATED COMMUNICATION LINK ESTABLISHMENT AND MANAGEMENT SYSTEM

(75) Inventors: Robert Michael Cohen, Redwood City, CA (US); Christopher W. Beall, San Jose, CA (US)

(73) Assignee: Connectandsell, Inc., San Mateo, CA (US)

( * ) Notice: Subject to any disclaimer, the term of this patent is extended or adjusted under 35 U.S.C. 154(b) by 0 days.

(21) Appl. No.: 13/412,698

(22) Filed: Mar. 6, 2012

(51) Int. Cl.
*H04M 3/00* (2006.01)
*H04M 5/00* (2006.01)

(52) U.S. Cl.
USPC ............ 379/266.07; 379/265.01; 379/265.05; 379/265.11; 379/265.12

(58) Field of Classification Search
USPC ............ 379/265.11, 265.12, 265.13, 265.14, 379/266.07, 265.01, 265.02, 265.03, 379/265.04, 265.05, 265.06, 265.07, 379/265.08, 265.09, 265.1, 266.01, 266.02, 379/266.03, 266.04, 266.05, 266.06, 379/266.08, 266.09, 266.1
See application file for complete search history.

(56) References Cited

U.S. PATENT DOCUMENTS

| | | | |
|---|---|---|---|
| 2007/0121902 A1* | 5/2007 | Stoica et al. ............. | 379/265.11 |
| 2012/0099720 A1 | 4/2012 | Soundar | |

* cited by examiner

*Primary Examiner* — Khai N Nguyen
(74) *Attorney, Agent, or Firm* — Snell & Wilmer L.L.P.

(57) ABSTRACT

Devices, methods and systems are disclosed herein for dynamically allocating agents during automated operation of a system performing attempts to establish communication connections between a user and a target. When human intervention is needed in order to further process an attempt to establish a communication connection between a user and a target, the system automatically selects the best available agent based upon the skills and experience of available agents in comparison to the conditions, characteristics, or requirements of the attempted communication connection.

6 Claims, 5 Drawing Sheets

DYNAMIC ALLOCATION OF AGENTS FOR OUTBOUND CALLING IN AN AUTOMATED COMMUNICATION LINK ESTABLISHMENT AND MANAGEMENT SYSTEM

BACKGROUND OF THE INVENTION

The present disclosure relates to a method and system for dynamically allocating agents during outbound calling in a system for facilitating call connections between a user and a target. For the sake of clarity and ease of understanding, references will be made to examples of applications for making sales calls. However, one of ordinary skill in the art will understand that the concepts described herein are applicable to any number of different fields, including, but not limited to, any contact relationship management system, telephone surveys, telephone number verification, census information gathering activities, fund raising campaigns, or any combination thereof.

An automated system for telephonically conducting simultaneous calling sessions on behalf of many users incurs ongoing labor costs due to the need for human agents to facilitate various parts of the calling process, such as navigating IVR trees, asking gatekeepers to transfer calls to prospects, detecting voice mail messages, and identifying prospects for final transfer to the calling user. An example of an automated system for facilitating telephone call connections between a user and a prospect is described in U.S. Patent Application Publication No. US 2007/0121902 A1, published May 31, 2007, entitled TRANSFER OF LIVE CALLS, based upon application Ser. No. 11/556,301, filed Nov. 3, 2006, the entire disclosure of which is incorporated herein by reference.

At many points during a call, such as when a phone is ringing or an IVR message is playing, the agent is effectively idle while the labor cost is still being incurred. The agent is also idle while the conversation is taking place between the calling user and the target. In addition, the agent is also idle after the conversation ends, during the period of time that the calling user may be taking notes, logging the call, or setting up follow-up activities. In addition, there may be times during a calling session when the calling user simply takes a break. In all these cases, excess labor costs are incurred for idle agents, and these costs adversely impact the gross profit margin of any business engaged in providing such calling sessions. The gross profit margin ultimately constrains pricing flexibility and restricts business model choices.

Additionally, if the system offers a guarantee or attempts to achieve a goal of a defined number of good connections during a session or defined period of time, it is desirable to be able to dynamically increase or decrease the total amount and quality of agent resources applied to any given session, depending on factors such as the calculated quality of the calling list, actual and historical rates at which connections are being made during the calling session, or to satisfy specific business requirements such as achieving a faster connection rate during a demonstration of the system, or testing the relationship of agent resource levels or agent skill levels to connection rates.

Finally, there may be a requirement to provision agents with specific skills, such as understanding or speaking a given language, to certain calling sessions. The labor costs associated with agents having different skills varies according to the skills. Therefore, it is desirable to be able to apply agents with an optimal skill level to execute all or part of any given call attempt within a calling session, so that lower skilled, less expensive agents can be utilized for activities commensurate with their skill level, without being required to commit for the entire duration of the calling session highly skilled, more expensive agents to execute other parts of the process that do not require a specific high value skill (at a higher labor cost).

Accordingly, what is needed is an improved automated calling system that allows an optimal set of agents to be pooled and dynamically assigned to different calling sessions on a just-in-time basis. A system that dynamically allocates agents by assigning the lowest cost agent available to perform a particular task at the moment that the task needs to be performed can increase gross profit margin by eliminating time that is wasted by having agents idle during various steps in the process, and by eliminating the high cost of more expensive, higher skilled agents during intervals of time in the calling session where their skills are not required. An improvement in automated calling systems that increases gross profit margin is of crucial importance, because of the constraining effect that gross profit margin has on pricing flexibility and available business model choices.

SUMMARY OF THE INVENTION

Devices, methods and systems are disclosed herein to describe an automated system for telephonically conducting simultaneous calling sessions on behalf of many users having dynamic allocation of agents for outbound calling.

In one embodiment, a communication link establishment and management system is provided that is operative to dynamically assign an agent to handle the establishment of a communication link and perform actions required to connect to the specific person who is the target of the communication. For example, the agent speaks with a gatekeeper, such as an administrative assistant or operator, and requests to be connected with the person who is the desired target. As an alternative example, the agent may take actions required to navigate an automated attendant system, such as pressing the buttons of a keypad to generate the necessary sequence of touch-tones to cause the automated attendant system to connect with the extension associated with the desired target person. The communication link establishment and management system selects an agent to handle a communication attempt when certain conditions are met, for example, when a telephone call is answered by someone at the called number. The agent selectively performs certain steps to establish communication with the specific person who is the target, and then promptly connects a user who may communicate directly with the target person once the communication link is established.

In one embodiment, a database is associated with the communication link establishment and management system to store information associated with the disposition of each attempted communication. The database also stores agent selection criteria, which includes information concerning selection characteristics for the available agents, such as information concerning an agent's skills and capabilities. When a communication attempt successfully establishes a connection, the communication link establishment and management system selects an agent to process the communication attempt based upon stored agent selection criteria.

In one embodiment, a database stores information concerning selection characteristics for available users, and when an agent successfully establishes communication with a specific target person, the communication link establishment and management system selects the user to connect with the target based upon stored user selection criteria.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION OF ONE OR MORE EMBODIMENTS OF THE INVENTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
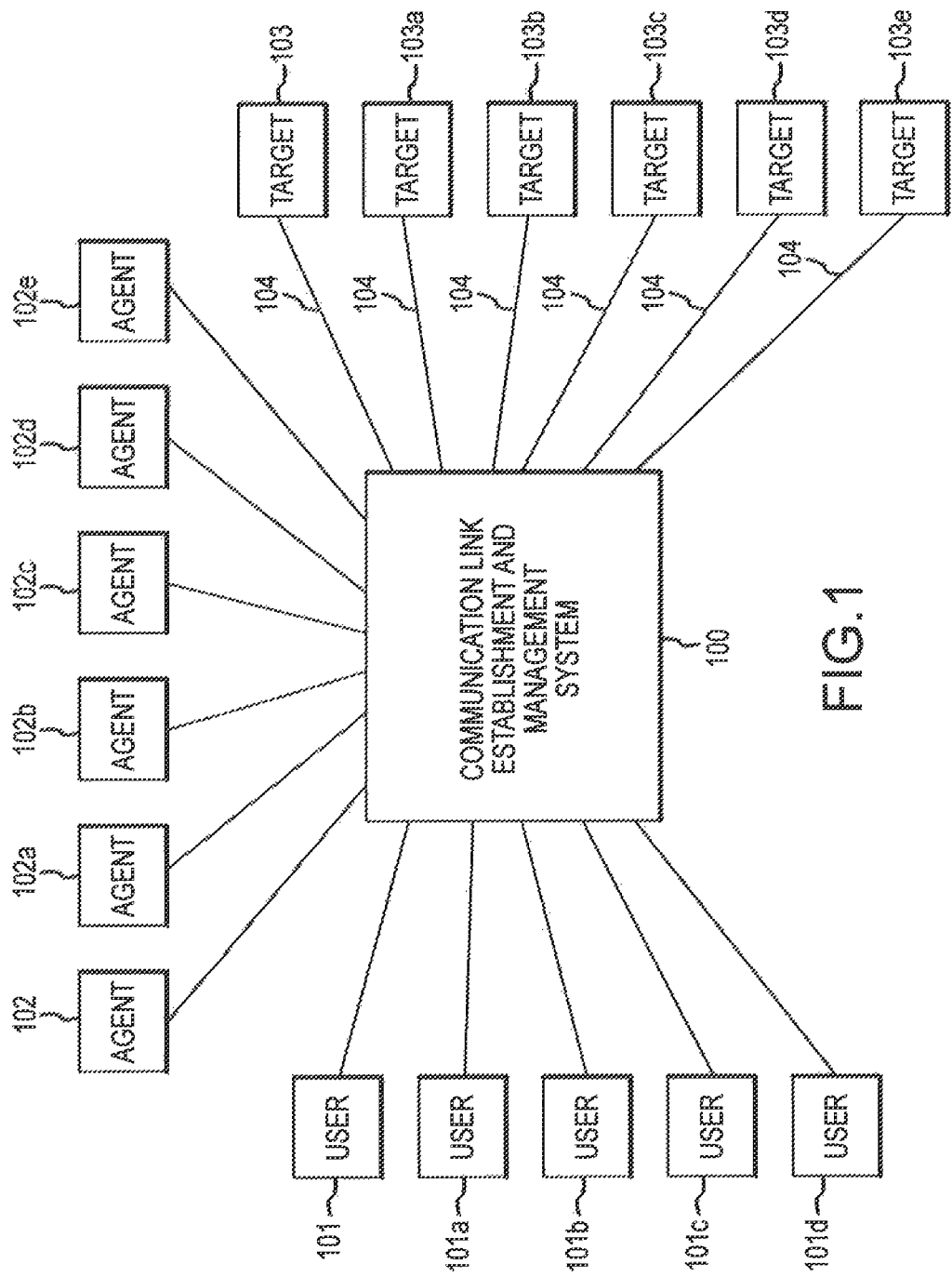
FIG. 1 is a block diagram depicting a system according to one embodiment described herein.

Referring to FIG. 1, a communication link establishment and management system 100 is provided. A plurality of users 101, 101a, 101b, 101c and 101d are shown in FIG. 1. In the illustrated example, the users 101 may be sales personnel who need to contract potential customers via telephone to sell a product or service. The communication link establishment and management system 100 is operative to establish communication with targets 103, 103a, 103b, 103c, 103d, 103e. As explained herein, the system 100 attempts to establish communication with a list of targets 103, and a calling list of targets 103 is generated and provided to the system 100 at the start of a calling session.

Although the communication link establishment and management system 100 provides the capability of simultaneously executing the same calling list for multiple users 101, 101a, 101b, 101c and 101d (under circumstances where any one of the users 101, 101a, 101b, 101c and 101d are equally capable of having a conversation with any target 103, 103a, 103b, 103c, 103d, 103e on the calling list) in most typical applications a given calling list will be executed on behalf of only one user 101a at a time.

In typical applications, a user 101a may provide a calling list to the communication link establishment and management system 100, or have a calling list automatically generated, for example, based upon queries to a database 111, or based upon queries to a separate customer relationship management system, contact management system, or task management system. Then that user 101a can sit back and wait for a few moments as the communication link establishment and management system 100 starts dialing, and as soon as the first successful communication link is established, the user 101a may start talking directly to desired target persons 103.

The communication link establishment and management system 100 has the capability of running a plurality of callings sessions simultaneously for multiple users 101a, 101b, 101c, 101d, and that is the typical operating mode for the system 100. While a first calling list is in use for a first user 101a, simultaneously a second calling list will be in use on the system 100 for a second user 101b, and a third calling list will be in use on the system 100 for a third user 101c, and a fourth calling list will be in use on the system 100 for a fourth user 101d. Each user 101a, 101b, 101c, and 101d has a unique calling list that is being executed for each respective calling session. Therefore, a plurality of agents 102a, 102b, 102c, 102d, 102e are available to assist in any of the simultaneously running calling sessions as needed.

In the illustrated example, communication with the targets 103 is established telephonically using the public switched telephone network 104. The public, switched telephone network (PSTN) refers to the worldwide network of public circuit-switched telephone networks, including telephone subscriber lines, telephone trunk lines, cellular networks, transoceanic telephone cables, fiber optic cables, microwave links, and satellite links, which are all inter-connected by switching centers. The PSTN allows any telephone in the world to be connected with any other for voice communication. The PSTN initially was a network of analog telephone systems connected to twisted pair cables. Over the years, the PSTN was upgraded to almost entirely digital switching networks, and now includes mobile telephones as well as fixed telephones.

As shown in FIG. 1, agents 102, 102a, 102b, 102c, 102d, 102e function to facilitate the establishment of a communication link between a user 101 and a target 103. In the illustrated example, an agent performs important functions in completing calls between a sales person 101 and a potential customer 103. Typically, users 101 participate in the calling activity of the system 100 during a period of time referred to as a calling session. The user 101 may have a sales pitch to deliver, and would like to deliver the pitch to sequential targets or potential customers 103 without substantial interruption or downtime between successful connections to a potential customer 103. The user or pitcher 101 is associated with a calling list that includes telephone numbers and target identifying information. The calling list may be extracted from a conventional contact management system, or customer relationship management system. An example of a commercially available customer relationship management system is salesforce.com.

The present invention provides significant advantages that may not be readily apparent to persons skilled in the art who have not witnessed the operation of the communication link establishment and management system 100 in practice. In one survey of over a hundred North American technology companies in the year 2010, the average inside sales person was only able to make 47 telephone call attempts a day. In attempting to complete calls to targets 103 to successfully engage in conversations with them, a business person must typically dial from a list of telephone numbers, navigate IVR systems and automated attendant systems, go through operators, talk to gatekeepers, go through company directories, listen to voicemail greetings, redial alternate numbers for a target 103 when the original number is busy, turns out to be a facsimile number, or there is no answer, and so forth. In order to achieve a rate as high as 47 call attempts a day, the average person must concentrate solely upon the calling activity to the exclusion of everything else.

In practice, the success rate is about twenty-two call attempts for every conversation successfully conducted with a desired target person 103. At a success rate of 22 to 1, a sales person who makes 47 calls a day will only average two to three conversations a day with desired targets 103. When the targets 103 are higher-level executives, the success rate drops even lower. For mid-level executives, experience has shown that the success rate is typically only about one out of every thirty-five call attempts. When the targets 103 are upper level management, the success rate drops even lower.

While the present description of an embodiment of the invention uses the example of a business that sells to potential customers over the telephone, the usefulness of the present invention is not limited to a telephone sales environment. In most businesses, having conversations with potential customers, potential investors, potential partners, existing customers, etc., is vital to the success of the business. Yet, as the value of the target person 103 goes up, the difficulty in establishing communication with the target 103 typically goes up as well, and consequently, the success rate of calling attempts goes down.

The value of the target 103 is not the only relevant factor. The value of the user 101 to the business is also an important consideration. As the value and importance of the user 101, who is attempting to establish communication with a target 103, goes up, such higher value users 101 typically have greater responsibilities in connection with their respective business, and usually have important meetings and other business activities that place demands upon the user's time. Therefore, an inverse relationship typically exists between the value and importance of the user 101 attempting to establish communication with a target 103, and the time that the user 101 has available to engage in dialing and attempting to call the target 103. Nevertheless, having communications with targets 103 is a business critical activity that must be done for the success of a user's business.

Experience has also shown that calls are more efficiently done if the calls are made in a block in which conversations concerning a similar theme or subject matter are concentrated together. This may be defined as monothematic calling sessions. For example, it is more efficient for a user 101 to arrange in a block, or a single calling session, all calls that the user 101 needs to make to venture capitalists with whom the user 101 wants to talk to about investing in the user's business. Or the user 101 may wish to devote a calling session to conversations with existing customers, either to gauge customer satisfaction, explore an expansion of the existing business, discuss a new product offering or product upgrade, etc. Or the user 101 may engage in a calling session for the purpose of engaging in conversations with a list of targets 103 that the user 101 wants to talk to about an expansion of the user's business into Europe or some other new territory.

Experience has shown that a user 101 generally has better results when engaging in conversations concerning the same subject matter or theme, if the conversations are grouped together and conducted in a concentrated activity. If a user 101 is able to engage in several conversations in a relatively rapid sequence, it is easier to take advantage of anything that is learned during a previous conversation and apply it to subsequent conversations. For example, it is easier for the user 101 to try different approaches and to accurately gauge which approach appears to achieve better results. When conversations occur in a concentrated fashion, it is easier for a user 101 to try different messages, to try different calling lists, or to try different times of day for attempting calls. For example, if a user 101 is attempting to manually place calls at the slow success rate typical of conventional dialing approaches, it is difficult for the user 101 to reliably determine such information as, for example, when is the best time of day to call potential customers on the East Coast, or what day of the week do targets 103 on a particular list having certain characteristics tend to answer the telephone more frequently, etc.

A communication link establishment and management system 100 in accordance with the present invention typically provides a user 101 with an average of ten conversations an hour with desired target persons 103. A system 100 in accordance with the present invention effectively divides the activity of attempting calls into three parts. The part that can be done automatically by a machine is performed by the system 100. The part that can be performed by a person with general skills relating to call placement, and which does not require expertise in the user's business and specialized knowledge relevant to the subject matter of the desired conversation, can be performed by agents 102. The part that requires the skill and expertise of a high value user 101, i.e., the actual conversation with a target person 103, is isolated so that, as far as the system 100 is concerned, the user 101 only spends time engaging in the actual desired conversations with the targets 103. While the system 100 and the agents 102 are working to successfully establish communication with a desired target person 103, the user 101 is free to engage in other work activities, such a reading emails, drafting correspondence, completing reports, etc. The user 101, who may be a high skilled person whose involvement in meetings and business decisions is crucial to the success of the users' business, is allowed to maximize the time available for such business critical activities, while at the same time efficiently using the user's time that is required to engage in important conversations with targets 103 which are vital to the success and growth of the user's business.

A communication link establishment and management system 100 in accordance with the present invention further provides the significant functional advantage of providing the ultimate diagnostic tool for a business. The ability to engage in concatenated conversations with existing customers, potential customers, existing investors, potential investors, existing partners, potential partners, etc., and then observe the results of those conversations and utilize the data and information gathered during such conversations, is an enormous advantage to any business. Such critical information is invaluable in analyzing and improving a business, and is important in the improvement of marketing campaigns, the improvement of sales approaches, the improvement of customer satisfaction and customer relations, the improvement of business strategies and business models, and the improvement of many other procedures, goals and activities. These and other advantages may not be relatively apparent unless and until a person skilled in the art actually observes and experiences the effectiveness and the operation of the present invention in practice.

in accordance with the present invention, each agent 102 that is defined in the system is described in a stored profile that includes a list of skills, such as languages spoken and understood, experience level, skills and training, certifications, along with optional proficiency scores for each skill and a score representing the agent's quality rating, based upon his or her historical success rate in achieving correct connections, normalized for the overall quality of calling lists for those past sessions. When an agent 102 logs into the communication link establishment and management system 100, the agent's identifier, session identifier, skills profile and quality score are recorded in a data structure that includes all currently available agents 102.

Target characteristic information associated with each target 103 may be stored in a database 111. During a calling session, this target characteristic information may be used in determining the best agent 102 to handle a calling attempt directed to that target 103. When the assistance of an agent 102 is needed to further process an attempted call to a particular target 103, the agent characteristic information may be compared with the target characteristic information, and a determination can be made to select the best available agent 102 based upon the results of such a comparison. For example, if the target 103 is a high priority high level executive, an agent 102 may be selected who has the best performance rating of all available agents, or who has the greatest experience. If the target 103 speaks Japanese, for example, then the agent characteristic information may be used to select an agent 102 who speaks Japanese.

Figure 5:
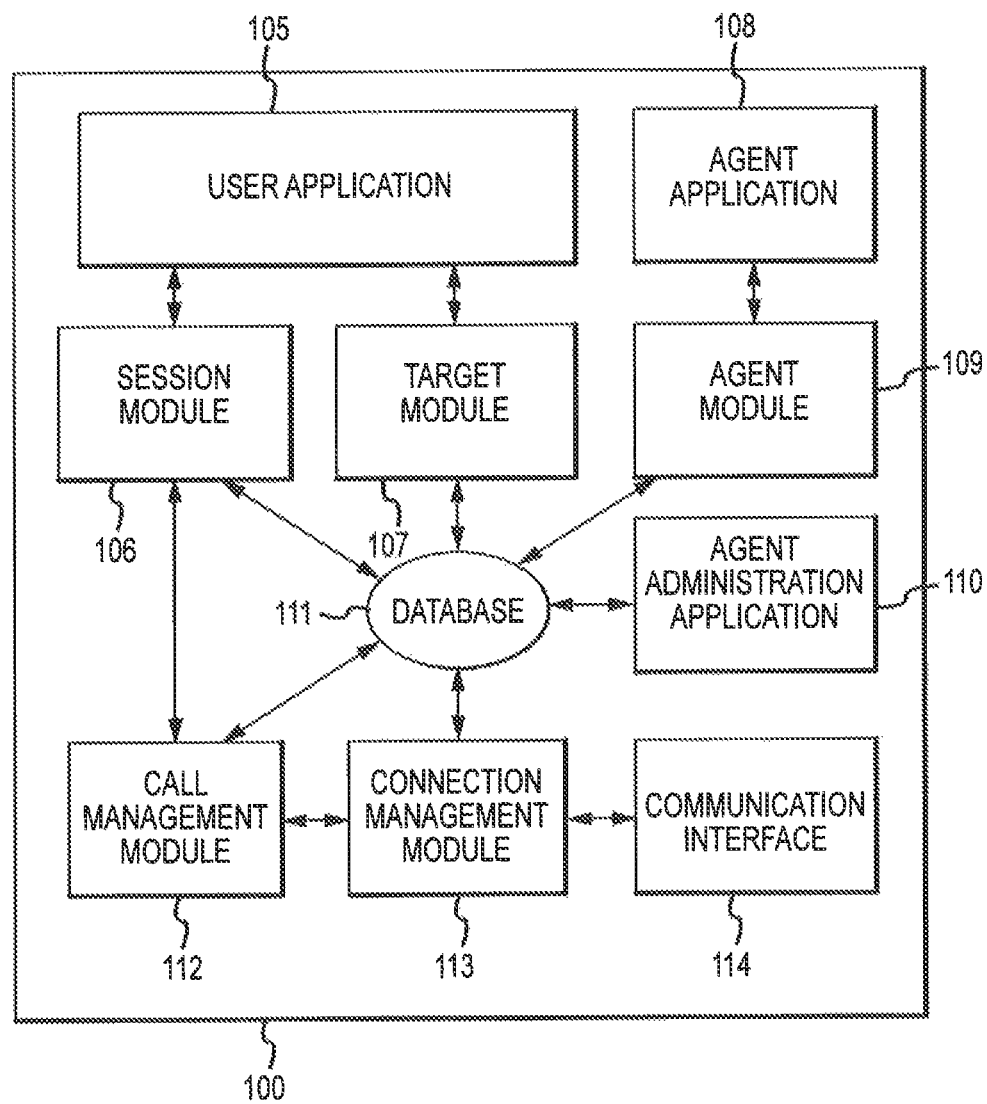
FIG. 5 is a block diagram illustrating further details of the communication link establishment and management system shown in FIG. 1.

FIG. 5 is a block diagram illustrating further details of the communication link establishment and management system 100 shown in FIG. 1. The communication link establishment and management system 100 may be implemented with a server. In the illustrated example, the communication link establishment and management system 100 comprises a user application 105, a session module 106, and a target module 107, all of which may be running on a server. The communication link establishment and management system 100 further comprises an agent application 108, an agent module 109, and an agent administrative application 110. A call management module 112, a connection management module 113, and a communication interface 114 are also provided. In one embodiment, the communication interface 114 may be a telephone interface, for example, where the communication link establishment and management system 100 is connected to the PSTN. In another embodiment, the communication interface 114 may be a network interface, for example, where the communication link establishment and management system 100 is connected to the Internet. A database 111 is stored on a data store, such as a hard disk drive, a RAM drive, or any other suitable storage device.

The user application 105 keeps track of the state of calls and other actions associated with the user 101, and generates any display or other output or interface provided to a user 101 during a calling session. In one embodiment, the user application 105 may reside on the server for the communication link establishment and management system 100, as shown in FIG. 5. A user 101 may interact with the communication link establishment and management system 100 using a web browser running on a personal computer. Alternatively, a portion of the user application 105 may be installed or downloaded onto a user device, such as the user's personal computer, or the user's smartphone or tablet, although in that case some small portion of the user application 105 may still reside on the communication link establishment and management system 100.

The session module 106 keeps track of the state of a currently running calling session. The session module will keep track of the state of a calling session, including whether the user 101 is busy at any given moment in time, whether the system 100 is dialing, whether the system 100 is pausing, whether the user 101 is talking, etc. The target module 107 keeps track of the state of events and conditions relating to targets 103, such as which targets 103 are being called, when the last call attempt was made to a target 103, historical calling attempts associated with a target 103, information relating to the quality of contact information associated with a target 103, such as bad numbers, updated information, etc. In one embodiment, call disposition data and information associated with targets 103 and a current calling list, are maintained in memory and at the end of a calling session, are stored in a database 111, which information may later be transferred to an external contact database or customer relationship management database.

Figure 4:
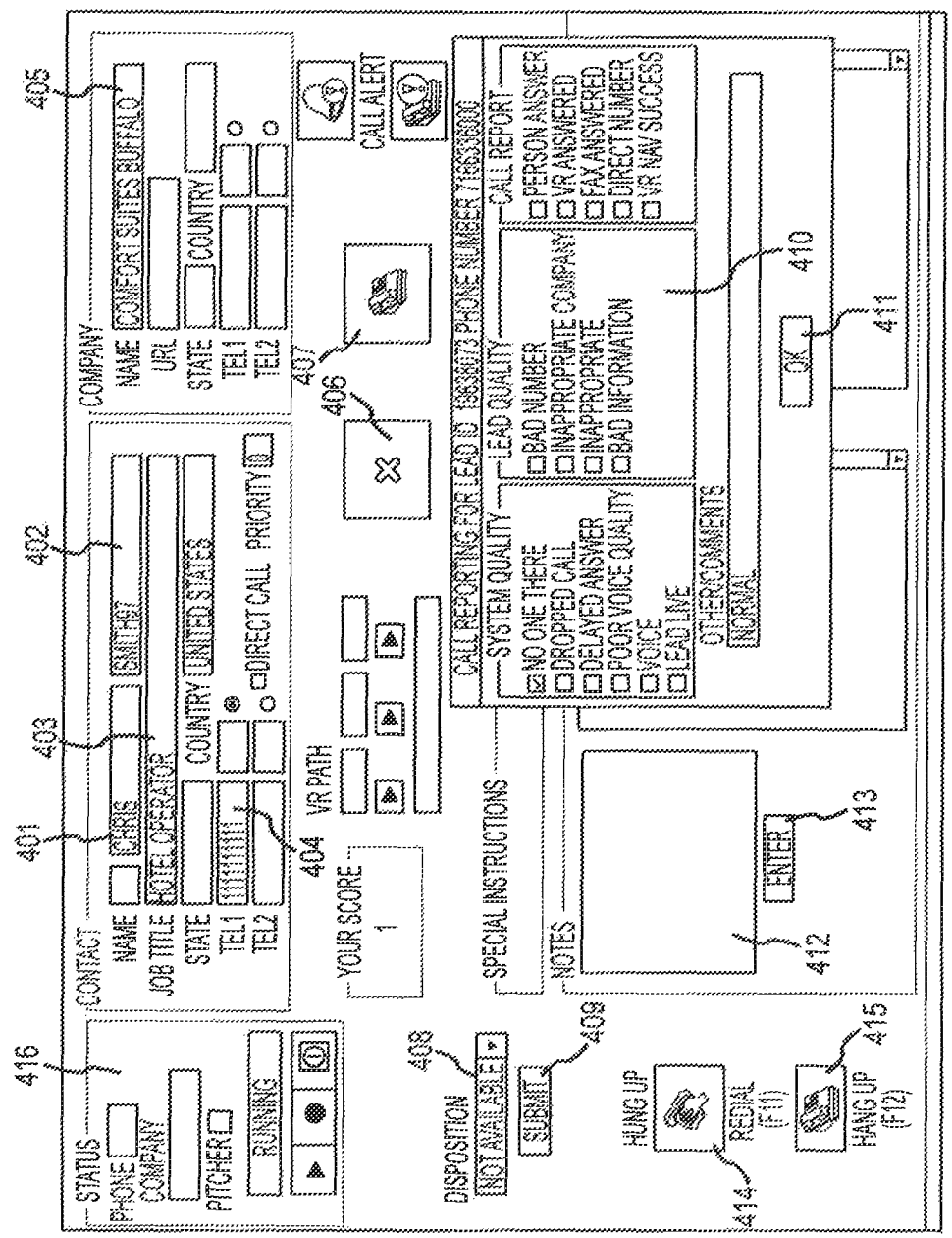
FIG. 4 illustrates a screenshot of the display provided for an agent interface according to one or more embodiments described herein.

The agent application 108 provides an interface with agents 102, and generates displays for agents 102 such as the screenshot shown in FIG. 4. The agent module 109 handles actions among the group of available agents 102a, 102b, 102c, 102d and 102e. The agent module 109 maintains agent characteristic information, such as agent skills (languages spoken, etc.), agent experience, agent cost, and other characteristic information. The agent module 109 shown in FIG. 5 performs the function of determining which agent 102a, 102b, 102c, 102d, or 102e should be selected to handle a calling attempt (based upon agent characteristic information and agent selection criteria) when a call attempt needs to be transferred to an agent 102 in step 207 shown in FIG. 2.

Referring to FIG. 5, the agent administration module 110 is used to create and update agent associated records and to identify each agent 102a, 102b, 102c, 102d, and 102e. For example, the agent administration module 110 maintains a table or index for data concerning each agent's cost (labor cost or pay rate), the identity of the vendor that supplied the agent 102, the employer of the agent 102 if the agent labor is outsourced, an agent ID or identifying indicia unique to each agent 102, the experience level of an agent, the number of calls handled by an agent, the average time interval between calls for each agent, and other performance metrics and agent characteristic information. The agent administration module 110 records data to track and score each agent's performance and other metrics that are useful in evaluating an agent 102.

The call management module 112 keeps track of call states, for example whether a telephone number is ringing, whether a user 101 is busy or is available for a call transfer, what calls are being attempted for a particular user 101, etc. The connection management module 113 controls and keeps track of each connection. For example, the connection module 113 keeps track of whether a user 101 actively involved in a calling session called into the system 100, or whether the system 100 called the user 101, and if so, at what number. The connection management module 113 is operative to cause a user 101 to be connected to a target 103 at appropriate times, for example, when an agent 102 clicks on the transfer button 406 shown in FIG. 4, which is described more fully below. The connection management module 113 is operative to cause an agent 102 to be connected to a calling attempt so that the agent 102 can hear the call in progress, and can communicate with a gatekeeper or navigate an automated attendant system.

In the illustrated embodiment shown in FIG. 5, the various modules may intercommunicate with each other via the database 111. In an alternative embodiment, a data bus or communication bus may be provided, and each of the modules 106, 107, 109, 112, and 113 may be connected to the bus in order to communicate with each other. In such an alternative embodiment, the database 111 would also be connected to the bus. In addition, the agent administration application would also communicate via the bus with the database 111 and the agent module 110.

The structure of the components of the communication link establishment and management system 100 having been described, attention will now be turned to the functionality of the various components. It is understood that the illustrated system 100 is merely one embodiment of how the features of the present invention may be implemented. However, a number of alternative configurations are possible. For example, the features of a server and the database 111 may be performed, in whole or in part, at a user device; (e.g., a personal computing device may be configured to achieve some or all of the functionality of a server and the database storage 111 described herein). Alternatively, the database storage 111 may be integrated on a separate server at a single location while communicating with the user 101 over a network 104, (e.g., the Internet). Those of ordinary skill in the art will recognize that a plurality of different implementations of the present invention are possible and are all within the spirit and scope of this disclosure. However, for the sake of clarity, the following description will refer to the illustrated system shown in FIG. 1.

Figure 2:
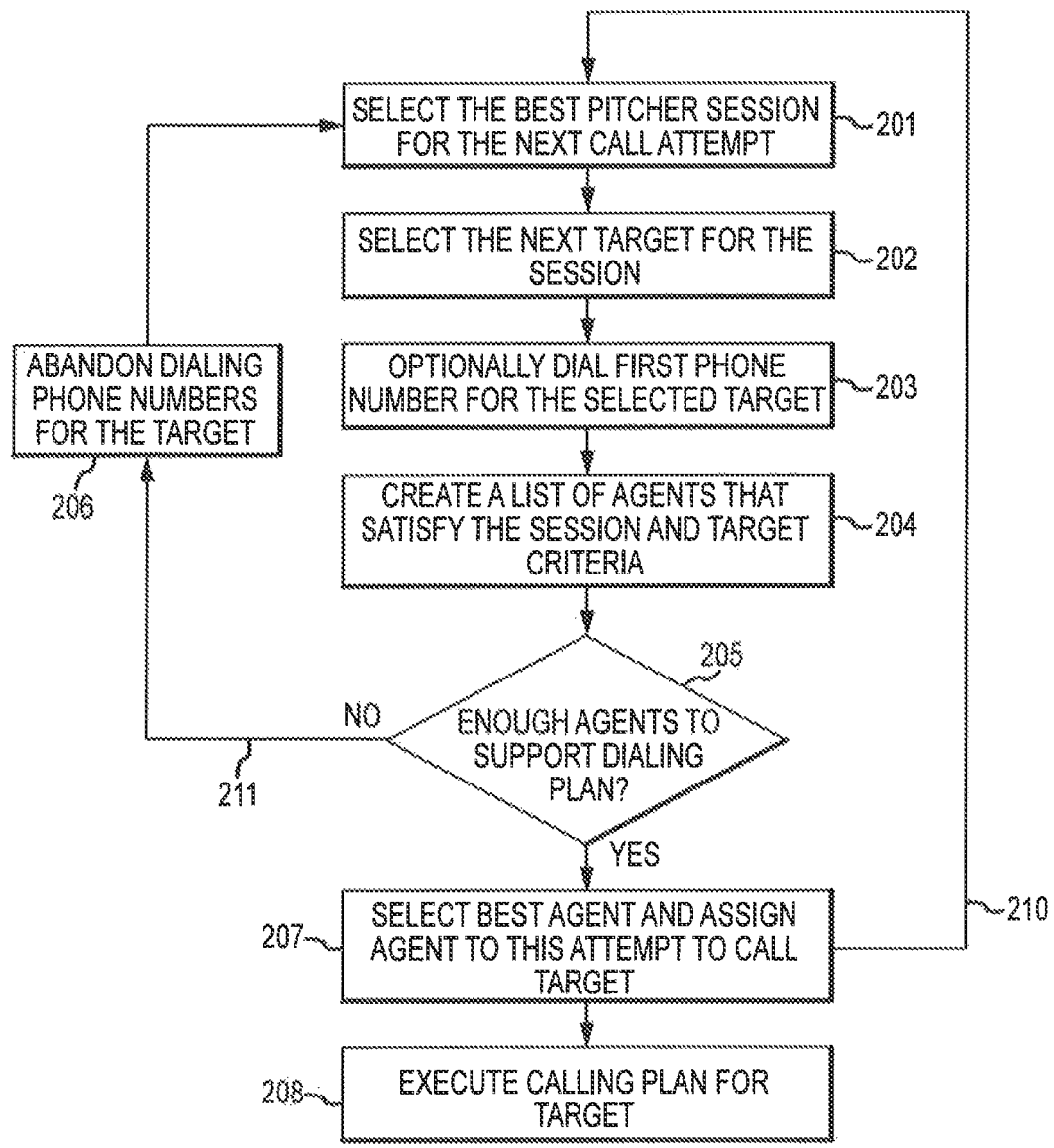
FIG. 2 illustrates a flow chart of one method of dynamically allocating agents according to one or more embodiments described herein.

FIG. 2 illustrates a flow chart of one method of dynamically allocating agents according to one embodiment described herein. The method described in FIG. 2, indicated generally with reference numeral 200, illustrates how the various components of the system 100 work together in one embodiment to selectively dial telephone numbers from a list of targets or contacts 103 with whom communication is desired.

The communication link establishment and management system 100 operates in a continuous loop as shown in FIG. 2. As shown, at step 201, the current set of calling users 101, or pitchers 101, is scanned to find the most appropriate pitcher 101 to make the next call attempt on behalf of his or her company (in this example, the company has products or services to sell). This user or pitcher 101 can be selected according to various configurable rules or user selection criteria, which may be modified while the system 100 is operating, such as: length of time since this user 101 last had a call attempt; number of successful connections per unit time in the session so far; anticipated difficulty in achieving the guarantee of a predetermined target number of conversational connections for this user 101 based on the ratio of successful connections to failed connections, and optional factors including the mean and median times to complete call attempts during the session so far; as well as optional factors such as the business priority of the session to achieve goals such as enhanced customer satisfaction for specific customers 103, or effectiveness of system demonstrations.

In the illustrated embodiment, at step 202, when a pitcher 101 is identified, the system 100 scans the pitcher's calling list for the next phone number to attempt to call. This number can be selected based on configurable rules that can include: choosing the next number in randomly assigned order that satisfies call pacing constraints optionally including a minimum duration between attempts to call the same number and a maximum number of calls to any one number during a session or other predetermined period of time; a next number in order of defined priority, or within a set of numbers sharing the same priority, that satisfy call pacing constraints; or a number selected by the user 101 during the session and marked as highest priority to be attempted next.

In one embodiment, an optional step 203 may be performed which dials the first telephone number for the selected target at this stage of the process.

When a next number to attempt is selected, at step 204, the list of agents 102 is scanned to identify at least one agent 102 to whom the attempt can be assigned. This agent 102 can be optionally locked to the attempt at this point, or can be left unlocked until one of a configurable set of conditions occurs, such as the telephone system detects that the call was answered. The agent 102 may therefore be optionally locked onto the attempt at various points in the process, depending on the rules configuration. These can include: when dialing begins; when dialing is completed; when the call is answered by a human being or voice mail greeting rather than an IVR system; and when the call is answered by an IVR system. An agent 102 is not assigned to the call attempt if it is for an invalid number, there is no answer, a busy signal is detected, or the call is answered by a fax machine.

In step 205, a determination is made concerning whether sufficient agents 102 are currently available, if there are no agents 102 that match the criteria required for the next attempt for a given, or there are an insufficient number of agents 102 available for the current number of simultaneous calls in progress, in step 205 the method branches via 211 to step 206, where the previously telephone number is abandoned, and then the method proceeds back to step 201, and a next pitcher 101 is identified according to the prioritization rules described above. For example, if the next pitcher 101 according to the prioritization rules requires a German speaking agent 102, and all German speaking agents 102 in the overall agent pool are currently locked on to call attempts, the list of pitchers 101 is re-scanned and a pitcher 101 with the second highest score according to the prioritization rules is selected for the next call attempt in step 201.

Because the best agent 102 preferably is not locked on to the attempt until one of the configurable set of positive call outcomes happens, it is possible that a tentatively selected first agent 102a becomes unavailable by being assigned to another call attempt that was happening in parallel. In this case, the list of agents 102 is scanned again to find a second agent 102b with the next best score according to predetermined agent assignment rules. Among the agents 102 that match the criteria for the next call attempt for the selected session, additional selection criteria may be applied to select the best agent 102 available. These criteria may include such factors as the labor cost of the agent 102, the agent's historical efficiency at generating connections, and meeting requirements to fairly distribute calls to agents 102 or meet obligations for minimum use of agents 102 provided by different vendors. In step 205, if no suitable agent 102 is available, the call attempt is disconnected and abandoned in step 206, and the system 100 returns to the outer loop at step 201 to select the best pitcher 101 for the next call attempt.

Once a first agent 102a is successfully associated with a first call attempt at step 207, the communication link establishment and management system 100 operates in parallel fashion, and the system 100 immediately proceeds back via 210 to begin a second call attempt at step 201 that may potentially involve the association of a second agent 102b. Simultaneously, the first agent 102a who was successfully associated with the first call attempt proceeds to take actions to process the first call attempt. This parallel functionality of the communication link establishment and management system 100 is a critical feature of the present invention, and this parallel functionality provides many significant advantages over prior systems that did not include such capability.

When a call attempt is assigned to an agent 102 in step 207, the agent 102 performs actions depending on the conditions associated with that particular call attempt in order to establish a communication link with the desired target person 103. This is illustrated in FIG. 2 by step 208, in which the calling plan for the associated target 103 is executed. In the illustrated example, the agent 102 is connected to the telephone call, and simultaneously presented with a screen display of information associated with the target 103, such as the target person's name, job title, company name, as well as other identifying information. As an example of the actions performed by the agent 102, if the call is answered by a gatekeeper, such as a secretary or administrative assistant, the agent 102 would ask to speak to the target person 103. If the call is answered by an IVR system, the agent 102 could respond to the IVR system in an appropriate fashion to obtain a connection to the desired target person 103. However, it should be appreciated that the system 100 performs certain functions during the execution of the calling plan step 208 shown in FIG. 2.

Figure 3:
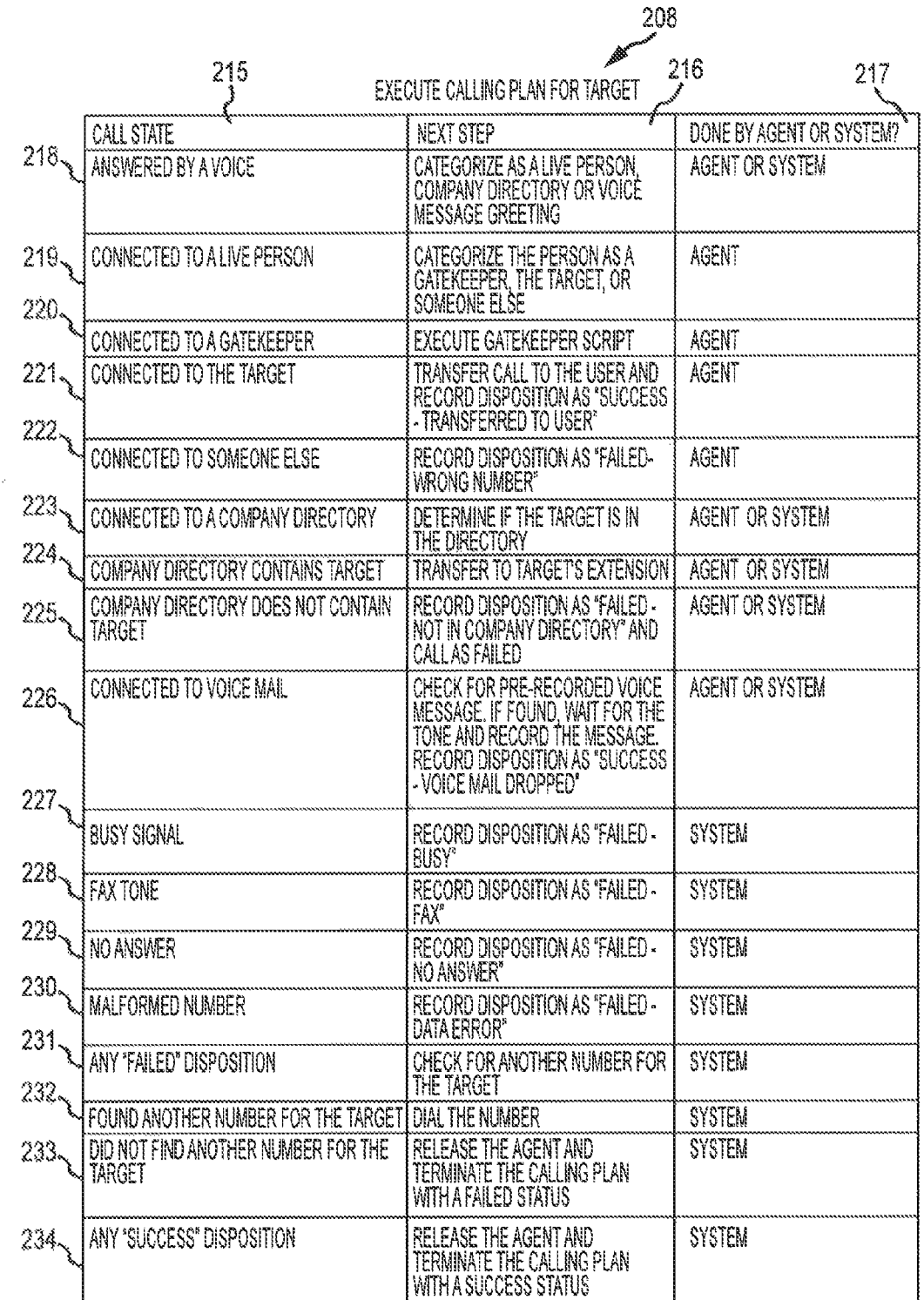
FIG. 3 illustrates a state table according to one embodiment described herein that is associated with the method depicted in FIG. 2.

FIG. 3 is a state table that illustrates in more detail the functionality and steps involved in the execution of a calling plan 208. The functionality involved in the execution of a calling plan may involve a number of different states and multiple possible sequences of states, and is best explained with a state table rather than a flow chart. FIG. 3 contains a left column 215 setting forth possible call states, and the middle column 216 sets forth the next step that potentially follows the associated call state. The right column 217 indicates whether the associated step is done by the agent 102, or automatically by the system 100, and in some instances, the associated step may be performed by either or both.

Referring to FIG. 3, in the first row 218, if the call is answered by a voice, an agent 102 is dynamically selected and assigned to this call attempt, and the agent 102 or the system 100 may categorize the call attempt as reaching a live person, an automated attendant or company directory, or a voice message greeting. The ability of a human agent 102 to make such a determination is apparent.

However, in an alternative embodiment, instead of a human agent 102 making the determination indicated in the first row 218 of the table, the communication link establishment and management system 100 may include a voice recognition software module, and an artificial intelligence or AI module, that are operative to decode the speech and ascertain what words were spoken by a live person, or an automated attendant, or a voicemail greeting, and automatically determine the correct state in the middle column 216 of the first row 218 that applies to this call attempt. The AI module may detect the language spoken by the voice answering the telephone, whether it is a live person, an automated attendant, or a voicemail greeting, and record the detected language in a record associated with the target 103 in the database 111. When the best agent 102 is selected in step 207 shown in FIG. 2, the language skills of the available agents may be compared with the language detected by the AI, or compared with stored information in the database 111 concerning the languages spoken by the target 103, and an agent 102 may be selected in step 207 that speaks the same language that is spoken by the target 103.

The AI module may include a database containing hash values for decoded voice recordings, and may include the functionality of recognizing when the same recording answers a telephone. The database may store information associated with a telephone answered by a particular voice recording, such as a record of the correct signals to transmit to an associated IVR system in order to navigate the IVR system or the correct signals to navigate a company directory associated with that recording. A sophisticated voice recognition AI module and database may be included to recognize the voice of the target person 103 in the event that the target person 103 answers the phone, and in some such instances, may complete the call between a user 101 and such target person 103 without any need for an agent 102.

Referring to FIG. 3, instances where a call is connected to the target person 103, the call state is depicted in the fourth row 221 of the left column 215. When that state is reached, the agent 102 (or the system 100 if automatic operation capability is provided) immediately transfers the call to an appropriate user 101, and the disposition of the call is recorded in an associated database as a successful communication link. In the event of a successful call disposition, the call state changes to the state indicated in the seventeenth row 234 of FIG. 3.

The second row 219 in FIG. 3 illustrates the state of a call that is answered by a live person, rather than a recording. It will be appreciated that the second row 219 is one state that is a possible outcome from the state explained above with respect to the first row 218 in FIG. 3. In this case 219, the agent 102 would typically determine whether the live person is a gatekeeper, is the target 103, or is some other person. However, as described above, a voice recognition AI module and database may be provided with the capability of recognizing the voice of the target person 103, or the voice of the target's regular gatekeeper, (such as the target's normal administrative assistant), and the determination described in the middle column 216 of the second row 219 may be determined automatically by the system 100.

An agent 102 may be provided with a script to use when a call attempt is answered by a gatekeeper. In addition, the agent 102 may be able to answer questions and to provide the gatekeeper with additional information concerning the purpose of the call. If the call attempt is answered by a gatekeeper, the call state is depicted in the left column 215 of the third 220 shown in FIG. 3. In the illustrated example 220, the agent 102 would read or recite a predetermined greeting or script to the gatekeeper.

Referring to FIG. 3, if the call state is a connection to someone else, as depicted in row five 222 of the left column 215, (for example, the telephone number provided in the calling list may be a wrong number or the target person may not work there any longer), the agent 102 records in an associated database 111 that the call attempt failed, and may save additional details relating to the call disposition.

If the call state is that the call is connected to a company directory, as indicated in the sixth row 223 of the left column 215 in FIG. 3, the next step in the method according to one embodiment is to determine whether the target 103 is in the company directory. This may be done by the agent 102. In addition, an AI module with voice recognition functionality may perform the same step automatically, with the system 100 making that determination.

If the target is determined to be in the company directory, then the call state goes to the state indicated in the seventh row 224 of the left column 215 of FIG. 3. The appropriate signals are transmitted to the company telephone system, typically in the form of touch tones sent to a PBX, to cause the company PBX to connect the call to the extension corresponding to the target 103. This step may be performed by the agent 102, or may be performed automatically by the system 100 in an embodiment having an AI module and a voice recognition module. Alternatively, previous calling experience with a particular telephone number may be saved in the database 111, and in the case of a main number to a business having a known automated attendant system whose commands are saved in the database, the system 100 may recognize when a telephone number is being called that it is a known automated attendant system. If the command structure for a known automated attendant system is saved in the database 111, the system 100 may proceed to automatically issue commands to the company's automated attendant system to cause the company PBX to transfer the call to the extension associated with the target 103 without connecting to an agent 102. Such functionality may be accomplished without an advanced AI module or voice recognition module.

Another outcome from the state indicated in row 223 is that the target is not contained in the company directory. In that event, the call state changes to the eighth row 225 of the left column 215 depicted in FIG. 3. The next step of the method according to one embodiment would be to record in the database 111 the call disposition as failed, and further record in the database additional information associated with the failed call attempt, such as the characteristic that the target 103 was not in the company directory.

One outcome of the call state in the first row 218 of FIG. 3 is that the voice turns out to be a voicemail greeting. In that event, the call state changes to the state indicated in the ninth row 226 of the left column 215 of FIG. 3. The agent 102, or in the case of an embodiment featuring automated operation the system 100, may check to determine whether there is a predetermined voicemail message recorded for this calling session and applicable to this target 103. If so, the system 100 may automatically take over the process of leaving a voicemail message for the target 103, and after detecting a tone indicating the beginning of a recording session by the target's company voicemail system, the system 100 will play the predetermined voicemail message in order for the message to be recorded by the company voicemail system. Upon completion of the voicemail message, the system 100 will terminate the call, and the call state changes to the state indicated in the seventeenth row 234 of FIG. 3.

One possible call state is that a busy signal is detected, as indicated in the tenth row 227 of FIG. 3. The next step will be performed automatically by the system 100. The busy signal is automatically detected by the system 100 without any intervention by an agent 102, and the system 100 automatically stores data relating to the call disposition in the database 111. In this case, a record indicating that the call attempt failed is stored, and associated information is stored in the database 111 showing that the call failed because of a busy signal. The call state then changes to the state indicated in the fourteenth row 231 of FIG. 3. In addition, the system 100 may also provide a means for adding the associated telephone number back in the list of numbers to be called during the current session in an effort to re-dial the number and again attempt a call to that number. Alternatively, the call disposition information stored in the database 111 may be queried at a later date to generate a calling list for a subsequent calling session that is intended to re-dial telephone numbers with certain associated call disposition characteristics, such as a list of call failures that were due to busy numbers on previous attempts.

Another possible call state is that the call attempt resulted in being connected to a facsimile machine, as indicated in the eleventh row 228 of FIG. 3. The system 100 automatically detects the facsimile machine, and stores call disposition information in the database 111 that the call failed due to the fact that the telephone number called was for a facsimile machine. The call state then changes to the state indicated in the fourteenth row 231 of FIG. 3.

As indicated in the twelfth row 229 of FIG. 3, in the case of no answer, the system 100 stores call disposition information in the database 111 that the call failed due to the fact that the telephone number called was not answered. The call state then changes to the state indicated in the fourteenth row 231 of FIG. 3.

If the call attempt resulted in a determination that the telephone number in the calling list was a malformed number, as indicated in the thirteenth row 230 of FIG. 3, the system automatically records in the database 111a call disposition indicating the there was a data error associated with the telephone number. The call state then changes to the state indicated in the fourteenth row 231 of FIG. 3.

When the call state is a failed call attempt, as indicated in the fourteenth row 231 of FIG. 3, the system 100 automatically checks to determine whether the database 111 or the calling list contains any other numbers for the target 103. If an alternate number is found, the call state changes to the state indicated in the fifteenth row 232 of FIG. 3, and an alternate number is dialed. If an alternate number is not found, the call state changes to the state indicated in the sixteenth row 233 of FIG. 3, and the disposition of the calling attempt would be indicated as failed, and this information would be stored in the database 111.

In the event of any successful call disposition, the call state changes to the state indicated in the seventeenth row 234 of FIG. 3. In that event, the system 100 releases any associated or selected agent 102 and terminates the calling plan with a success status stored in the database associated with the target 103. The system 100 may then loop back to begin another call attempt at step 201 in FIG. 2.

FIG. 4 shows a screenshot of an example of a screen display 400 presented to an agent 102 when the agent 102 is connected to a call attempt in progress. The display 400 illustrated in FIG. 4 provides the agent 102 with identifying data for the target 103, such as the target's first name 401, last name 402, job title 403, and telephone number 404. (A fictitious telephone number is illustrated in FIG. 4.) The company 405 associated with the target 103 is also preferably displayed to the agent 102.

The agent 102 is preferably also provided with information associated with the user or pitcher 101 tentatively selected for this call, if the call attempt is successful. User associated information may be displayed in user display box 416. For example, if a call is answered by an operator or gatekeeper, the agent 102 can ask if the target person 103 is available to speak with the designated user 101, and the agent 102 can identify the designated user 101 by name (and company if applicable). For example, the agent 102 would be able to ask if "Mr. Chris Smith is available to speak with Mr. Jim Jones," assuming the user 101 is Jim Jones and the user's name is displayed to the agent 102 in the user display box 416.

If the agent 102 is successful at reaching the first target person 103a, the agent 102 clicks on the transfer button 406, and the call is transferred to an appropriate user 101. The transfer signal resulting from the agent 102 clicking on the transfer button 406 is handled by the connection management module 113 shown in FIG. 5. The agent 102 is then immediately free to enter data concerning the call disposition and then handle another call attempt associated with a second target person 103b. This method results in optimum utilization of the agent 102, and the agent 102 is involved with a call attempt only during a limited time period when the assistance and involvement of a human agent 102 is required. All other steps associated with a call attempt are performed automatically by the system 100.

Referring to FIG. 4, if instead of reaching the target person 103, the agent 102 is referred to, or otherwise reaches a voicemail for the desired target 103, the agent 102 may optionally click on the leave voicemail message button 407. In a preferred embodiment, a prerecorded voicemail message is automatically left by the system 100, and the agent 102 is freed up immediately after clicking on the leave voicemail message button 407 to enter data concerning the call disposition and then take another call attempt. When the agent 102 clicks on the leave voicemail message button 407, the system 100 waits on the target's voicemail system and spends the time necessary to automatically record a predetermined voicemail message without further human intervention or involvement.

There may be some instances when it is desirable for an agent 102 to be capable of hanging up on a call in progress, and in the illustrated embodiment, the agent 102 may do so by clicking on a hang up button 415. In some instances, for example when the agent 102 is speaking to someone over a cellular phone and the target's cell phone drops the call, the agent 102 can hang up and redial the number by clicking on the redial button 414.

Before the agent 102 is available to be connected to another call attempt, the agent 102 preferably enters call disposition data that is stored in a database or data store. A drop down menu 408 may be provided from which the agent may select an appropriate call disposition instance and record the data by clicking on an associated call disposition submit button 409. An agent 102 may also be provided with a popup window 410 that provides a selection of possible characteristics for system quality, lead quality, and call report, which may be recorded by the agent 102 and submitted by clicking on call data record button 411. In the illustrated example, available system quality characteristics that may be recorded include "no one there," "dropped call," "delayed transfer," "poor voice quality," "voice late," and "lead late." Lead quality characteristics provided in this example include "bad number," "inappropriate company," "inappropriate, title," and "bad information." In the illustrated example, call report data that may be recorded in a data store includes "person answered," "IVR answered," "fax answered," "direct number," and "IVR navigation success." These examples are illustrative only, and a person skilled in the art will appreciate that many other outcomes and characteristics may be provided for the agent 102 to optionally record.

An agent 102 may also type notes associated with a call attempt in a text box 412, and save the notes by clicking on notes save button 413. The notes typed by the agent 102 will be saved in a data store within a database so that the notes are associated with the target or customer 103. Moreover, when a call in progress is referred to a second agent 102b, any previously typed notes saved by a first agent 102a may be displayed to the second agent 102b in the notes window 412.

The screen display 400 shown in FIG. 4 is illustrative only, and persons skilled in the art will appreciate that different configurations and arrangements may be provided for an agent display screen in accordance with the spirit and scope of the present invention.

The example shown in FIG. 1 is illustrative of one embodiment. The public switched telephone network 104 may be replaced, in whole or in part, with a network 104, such as the Internet 104. The system 100 may include a user device operated by the user 101, such as a client computer connected to a network employing client-server architecture. The system 100 preferably includes a server and a database store 111. The server and the database 111 are preferably integrated into one physical device, but other arrangements are possible. Alternatively, the server and the database 111 may be integrated, while the user device is remote, for example, a client computer or tablet device running a browser that communicates with the system 100 over a network using TCP/IP protocol. Alternatively, the server running the system 100 and a separate server containing the database 111, may communicate with each other via a local area network or a wide area network, including the Internet. An ordinary artisan will understand that that the system 100 illustrated in FIG. 1 is only one example, that many other configurations are possible and further, duplicative components may be eliminated where possible.

A server suitable for implementing the system 100 may comprise a computing device, and may include a processor, a memory, a network interface, and appropriate software. The database 111 may be stored on a server comprising a computing device, and may include a processor, a memory, a network interface, a database module, and a data storage device such as a hard drive.

The system 100 may enforce call processing and connection rules and may be tasked with controlling a second separate third-party database containing contact associated information, and may be provided with the necessary privileges and authorization to make changes to the third-party database associated with thereof. The communication link establishment and management system 100 may interface with conventional customer relationship management programs and databases, such as salesforce.com and the like, in order to provide the functionality and advantages of the present invention without requiring a business to discard its existing tools and software, and without requiring expensive and disruptive software replacements and upgrades. For example, the system may include a server operative to create database records in a database 111 associating results of connected calls, unsuccessful call attempts, bad telephone numbers, and information obtained from communications with person(s) contacted.

More particularly, in response to receiving information during and as a result of a connection or unsuccessful attempt at a connection, closed loop calling process functionality may be employed. The system 100 may use the information in the database 111 to create additional lists and new groups of telephone numbers for other purposes, such as follow up calls or re-attempts, and/or make changes and updates to the current customer relationship information in conventional customer relationship management programs and databases, such as salesforce.com and the like. Further, the system 100 may use call disposition data to improve the quality of calling lists, for example, by deleting bad telephone numbers, by changing the telephone numbers for a target person 103 when the target 103 changes jobs or moves to a different location, by storing the necessary sequence of touch tones that must be generated in order to navigate an automated attendant at a particular target's telephone number in order to reach the desired target 103, etc. In practice, the quality of information in any set of contacts or calling list degrades over time, because people change jobs, their business moves to a new location, they are promoted to a new position or change job responsibilities with the same company, they retire, they change their name (for example, as a result of a marriage or a divorce), or a person may be deceased. One by-product of the operation of the system 100 is to improve the quality of the information in a set of contacts or calling list by eliminating or updating incorrect information.

The database 111 preferably stores information associated with individual targets 103 that may be discovered during calling sessions. For example, the telephone number that a target 103 is most likely to answer may be stored. The language(s) spoken by the target 103 may be stored in the database 111.

The actual time zone were the target 103 is located is also stored. Prior to the widespread use of mobile phones, telephone numbers were associated with physical locations, and the area code associated with the telephone number would uniquely identify the time zone where the telephone was located. A new paradigm has emerged with the widespread use of cellular telephones, and now a telephone number is associated with a person instead of a physical location. Because people are mobile, the area code of a cellular telephone number is not a reliable indication of the time zone where the person associated with the cellular telephone number is located. In addition, a cellular telephone subscriber may not want to change telephone numbers when the subscriber moves to a different area code, and there is no requirement that a subscriber must do so. Therefore, because contact information associated with a target 103 frequently includes mobile telephone numbers, the area code of a telephone number associated with a target 103 does not always match the time zone where the target 103 may be located when an attempted call is made to the target 103.

The database 111 may store customer relationship and contact information, index information for the customer contacts and relationships, contact database element relationships and contact relationship element component related information. In addition, the database 111 may store authentication, template definitions, and/or business rules. Given that the database 111 stores useful and valuable information as a by-product of the operation of the system 100, the information that is collected, verified, and updated in the database 111 can be used by a second business having a calling list that overlaps with a previous calling list from a first business, and at least some of the targets 103 or telephone numbers are the same. For example, the first business might conduct a calling session using a calling list that included a number of targets 103 for which the only telephone number available was the main telephone number for a large corporation, and each such target 103 required navigation of the company directory or other efforts were required to obtain a direct dial number for the targets 103. Thereafter, a second business might conduct a calling session that includes targets 103 with the same large corporation, and which only have the main telephone number provided. The system 100 may conduct the calling session for the second business more efficiently by taking advantage of any direct dial numbers obtained for common targets 103 who were on the calling list for the first business, and by recording information concerning the navigation of the company directory to more quickly locate the targets 103 at that telephone number for whom no direct dial number is available. If the system 100 is used by a number of businesses in an industry, the system 100 may, as a by-product of the upgrading and updating of contact information that occurs during operation of the system 100, effectively produce a database 111 of contact information that is more current and of a higher quality than any conventional telephone book or published directory.

The illustrated example described herein may be employed in one embodiment. However, one skilled in the art will understand that any of a plurality of embodiments may be utilized to perform the methods described herein. For example, FIG. 1 shows six agents 102. However, it should be understood that the number of agents 102 is arbitrary, and any number of agents 102 may be used in connection with the communication link establishment and management system 100. Similarly, the example shown in FIG. 1 has five users 101. However, it should be understood that the number of users 101 is arbitrary, and any number of users 101 may be used in connection with the communication link establishment and management system 100. Further, any number of targets 103 may be simultaneously contacted by the communication link establishment and management system 100, and the invention is not limited to the number of targets shown in the illustrated example of FIG. 1.

The term "communication link" as used herein may be defined broadly to include any channel of communication between two or more persons. In the context of this description, a "communication link", in addition to the examples cited herein, may be a wireless data connection, a radio transmission, a satellite connection, a VoIP connection, a television or video connection, or any data path or communication channel that permits a conversation to take place between a user and a target.

Those of ordinary skill will also understand that the various illustrative logical blocks, modules, and algorithm steps described in connection with the examples disclosed herein may be implemented as electronic hardware, computer software, or combinations of both. Furthermore, the present invention can also be embodied on a machine-readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in tangible, non-transitory memory such as RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a user device, a wireless device, or a smartphone. In the alternative, the processor and the storage medium may reside as discrete components in a user device, a wireless device, or a smartphone.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

The invention claimed is:

1. A communication link establishment and management system for dynamically allocating agents automatically during outbound calling in order for a selected agent to assist in establishing a communication connection between a user and a target, comprising:

the communication link establishment and management system configured to selectively establish a communication channel between a user and a target, wherein the user is knowledgeable about a subject matter of a call with the target, and wherein the communication link establishment and management system including an agent application for interfacing with a plurality of agents and configured to selectively link to said agents to assist the system in completing outbound call attempts, the communication link establishment and management system having a data store for storing agent characteristic information for each agent;

the communication link establishment and management system being operative to initiate a plurality of outbound calling attempts to establish communication between a plurality of users with a plurality of targets, and to automatically establish a link with an agent selected from a group of available agents when human intervention is desired to finish a calling attempt; and the communication link establishment and management system being programmed to automatically select an agent to assist with a calling attempt when human intervention is desired by determining a best available agent based upon stored agent characteristic information for said selected agent.

2. The communication link establishment and management system according to claim 1, wherein:

the communication link establishment and management system further comprises an agent module, the agent module being operatively associated with the agent application, and wherein the agent module includes programmed rules for automatically selecting the agent to assist with a calling attempt when human intervention is desired based upon stored agent characteristic information concerning languages spoken by said agent.

3. The communication link establishment and management system according to claim 1, wherein:

the communication link establishment and management system further comprises an agent module, the agent module being operatively associated with the agent application, and wherein the agent module includes programmed rules for automatically selecting the agent to assist with a calling attempt when human intervention is desired based upon stored agent characteristic information concerning the experience or skill level of said agent.

4. In a communication link establishment and management system, a method for dynamically allocating agents automatically during outbound calling in order to select an agent to assist in establishing a communication connection between a user and a target when human intervention is desired to complete a call, comprising the steps of:

selecting a target for an attempted communication from a predetermined group of targets having stored contact information associated with at least some of said targets;

automatically attempting to establish a communication connection between the user with the selected target using stored contact information associated with said target;

automatically processing an attempted communication connection until conditions are encountered wherein human intervention is needed in order to complete the attempted communication connection;

when human intervention is needed in order to complete an attempted communication connection, automatically selecting an agent to assist in the completion of the attempted communication connection by determining an agent who is suitable to assist in the completion of the attempted communication connection based upon stored agent characteristic information for available agents, and wherein the user is knowledgeable about a subject matter of the call with the target.

5. The method according to claim 4, wherein:

an agent is automatically selected to assist in the completion of an attempted communication connection by determining an agent who is suitable to assist in the completion of the attempted communication connection based upon stored agent characteristic information concerning languages spoken by said agent.

6. The method according to claim 4, wherein:

an agent is automatically selected to assist in the completion of an attempted communication connection by determining an agent who is suitable to assist in the completion of the attempted communication connection based upon stored agent characteristic information concerning experience and skill level of said agent.

* * * * *